United States Patent
Furukawa et al.

(10) Patent No.: US 7,364,000 B2
(45) Date of Patent: Apr. 29, 2008

(54) SUSPENSION APPARATUS OF VEHICLE

(75) Inventors: Masataka Furukawa, Shizuoka (JP); Takao Tomonaga, Shizuoka (JP)

(73) Assignee: Showa Corporation, Saitama (JP)

( * ) Notice: Subject to any disclaimer, the term of this patent is extended or adjusted under 35 U.S.C. 154(b) by 259 days.

(21) Appl. No.: 10/860,915

(22) Filed: Jun. 4, 2004

(65) Prior Publication Data
US 2005/0116437 A1   Jun. 2, 2005

(30) Foreign Application Priority Data
Nov. 27, 2003 (JP) ............................ 2003-398067

(51) Int. Cl.
*B62D 61/002* (2006.01)

(52) U.S. Cl. .................. 180/227; 280/284; 280/285; 280/286; 280/124.128; 188/267

(58) Field of Classification Search ................ 188/267; 180/227; 280/284, 285, 286, 124.1
See application file for complete search history.

(56) References Cited

U.S. PATENT DOCUMENTS

| | | | | |
|---|---|---|---|---|
| 3,158,232 A | * | 11/1964 | Doetsch et al. | 188/282.8 |
| 4,712,638 A | * | 12/1987 | Kawaguchi et al. | 180/219 |
| 5,158,161 A | * | 10/1992 | Yamaoka et al. | 188/319.1 |
| 5,348,112 A | * | 9/1994 | Vaillancourt | 180/227 |
| RE34,897 E | * | 4/1995 | Richardson et al. | 180/227 |
| 5,810,130 A | * | 9/1998 | McCandless | 188/322.22 |
| 5,839,536 A | * | 11/1998 | Tanaka | 180/227 |
| 6,071,096 A | * | 6/2000 | Grasl | 417/534 |
| 6,595,310 B2 | * | 7/2003 | Gogo | 180/219 |
| 6,823,958 B2 | * | 11/2004 | Domenicali et al. | 180/227 |
| 2006/0113134 A1 | * | 6/2006 | Czysz | 180/227 |

FOREIGN PATENT DOCUMENTS

| | | | |
|---|---|---|---|
| JP | 5929468 | | 7/1984 |
| JP | 06107263 A | * | 4/1994 |
| JP | 200268066 | | 3/2002 |

* cited by examiner

*Primary Examiner*—Ruth Ilan
*Assistant Examiner*—Timothy Wilhelm
(74) *Attorney, Agent, or Firm*—Orum & Roth LLC

(57) ABSTRACT

The invention provides a suspension apparatus of a vehicle comprising a base end portion of a swing arm pivotally attached to a vehicle body so as to freely oscillate, and a wheel which is rotatably supported to a leading end portion of the swing arm. A first link is pivotally attached to a portion between the base end portion and the leading end portion of the swing arm. A second link is pivotally attached to a position which is below a pivot point to which the base end portion of the swing arm is pivotally attached in the vehicle body, and the first link and the second link are pivotally attached. One end of a cushion unit is pivotally attached to the vehicle body. Another end of the cushion unit is pivotally attached to one of the first link and the second link, in which the first link or the second link comprises an expandable link. The expandable link is energized in a contracting direction.

18 Claims, 10 Drawing Sheets

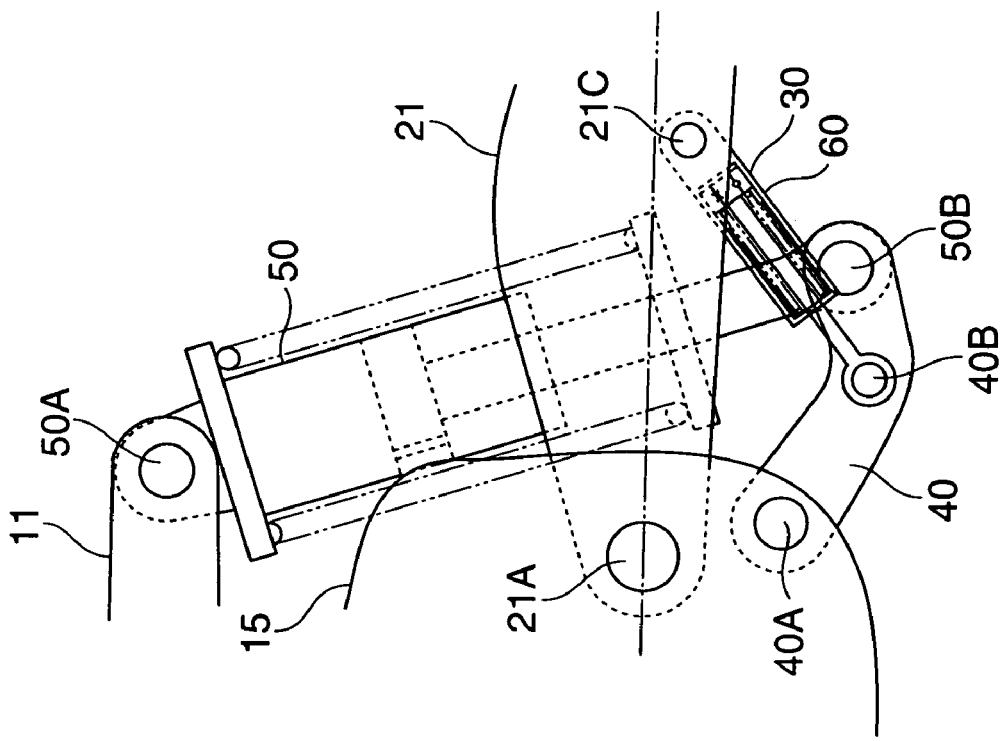
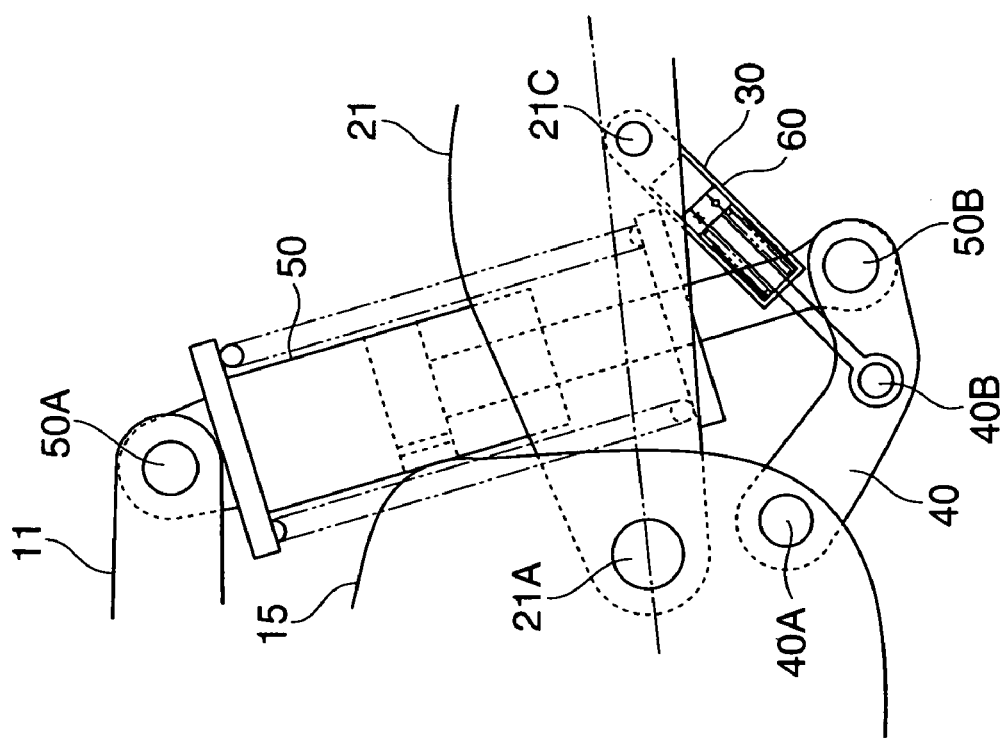

SUSPENSION APPARATUS OF VEHICLE

BACKGROUND OF THE INVENTION

1. Field of the Invention

The present invention relates to a suspension apparatus of a vehicle in which a cushion unit (a hydraulic shock absorber) is provided between a vehicle body and a swing arm.

2. Description of the Related Art

In a conventional suspension apparatus of a vehicle, as described in Japanese Patent Publication No. 59-29468 (JP-B), there is a structure in which a base end portion of a swing arm is pivotally attached to a vehicle body so as to freely oscillate. A wheel is rotatably supported to a leading end portion of the swing arm. A first link is pivotally attached to a portion between the base end portion and the leading end portion of the swing arm. A second link is pivotally attached to a position which is below a pivot point to which the base end portion of the swing arm is pivotally attached in the vehicle body. The first link and the second link are pivotally attached. One end of a cushion unit is pivotally attached to the vehicle body, and another end of the cushion unit is pivotally attached to one of the first link and the second link.

In another conventional suspension apparatus of a vehicle, as described in Japanese Patent Application Laid-open No. 2002-68066 (JP-A), there is a structure in which a base end portion of a swing arm is pivotally attached to a vehicle body so as to freely oscillate. A wheel is rotatably supported to a leading end portion of the swing arm. A first link is pivotally attached to a portion between the base end portion and the leading end portion of the swing arm. A second link is pivotally attached to a position which is below a pivot point to which the base end portion of the swing arm is pivotally attached in the vehicle body. The first link and the second link are pivotally attached. One end of a cushion unit is pivotally attached to the swing arm, and another end of the cushion unit is pivotally attached to one of the first link and the second link.

In the suspension apparatus of the vehicle in accordance with JP-B 59-29468 and JP-A 2002-68066, it is intended to secure a road holding property of a wheel on the basis of a damping property of the cushion unit. However, there is a case that a following characteristic in an elongating direction is deteriorated due to an elongation side damping force. In other words, in the case that a load applied to the wheel (a rear wheel) from the road surface is reduced while running on a road surface gap or braking, the wheel leaves the road surface, so that there is a risk that driving force is reduced and stability of the vehicle is deteriorated.

SUMMARY OF THE INVENTION

An object of the present invention is to improve a road surface following property or road holding of a wheel in a suspension apparatus of a vehicle in which a cushion unit is provided between a vehicle body and a swing arm.

The present invention relates to a suspension apparatus of a vehicle structured such that a base end portion of a swing arm is pivotally attached to a vehicle body so as to freely oscillate, and a wheel is rotatably supported to a leading end portion of the swing arm. A first link is pivotally attached to a portion between the base end portion and the leading end portion of the swing arm. A second link is pivotally attached to a position which is below a pivot point to which the base end portion of the swing arm is pivotally attached in the vehicle body. The first link and the second link are pivotally attached. One end of a cushion unit is pivotally attached to the vehicle body, and another end of the cushion unit is pivotally attached to one of the first link and the second link. The first link or the second link is an expandable link, and the expandable link is in an expandable manner and is energized in a contracting direction.

The present invention relates to a suspension apparatus of a vehicle comprising a base end portion of a swing arm pivotally attached to a vehicle body so as to freely oscillate, and a wheel rotatably supported to a leading end portion of the swing arm. A first link is pivotally attached to a portion between the base end portion and the leading end portion of the swing arm. A second link is pivotally attached to a position which is below a pivot point to which the base end portion of the swing arm is pivotally attached in the vehicle body. The first link and the second link are pivotally attached. One end of a cushion unit is pivotally attached to the swing arm, and another end of the cushion unit is pivotally attached to one of the first link and the second link. The first link or the second link comprises an expandable link, and the expandable link is in an expandable manner and is energized in a contracting direction.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 3A and 3B show an operating state of the suspension apparatus in accordance with the embodiment 1, in which FIG. 3A is a schematic view showing an upward moving state of the swing arm, and FIG. 3B is a schematic view showing a downward moving state of the swing arm;

FIGS. 7A and 7B show a suspension apparatus in accordance with an embodiment 2, in which FIG. 7A is a schematic view showing an assembled state and FIG. 7B is a schematic view showing a downward moving state of a swing arm;

FIGS. 8A and 8B show a suspension apparatus in accordance with an embodiment 3, in which FIG. 8A is a schematic view showing an assembled state and FIG. 8B is a schematic view showing a downward moving state of a swing arm;

FIGS. 9A and 9B show a suspension apparatus in accordance with an embodiment 4, in which FIG. 9A is a schematic view showing an assembled state and FIG. 9B is a schematic view showing a downward moving state of a swing arm.

DESCRIPTION OF THE PREFERRED EMBODIMENTS

Embodiment 1—FIGS. 1 to 6

Figure 1:
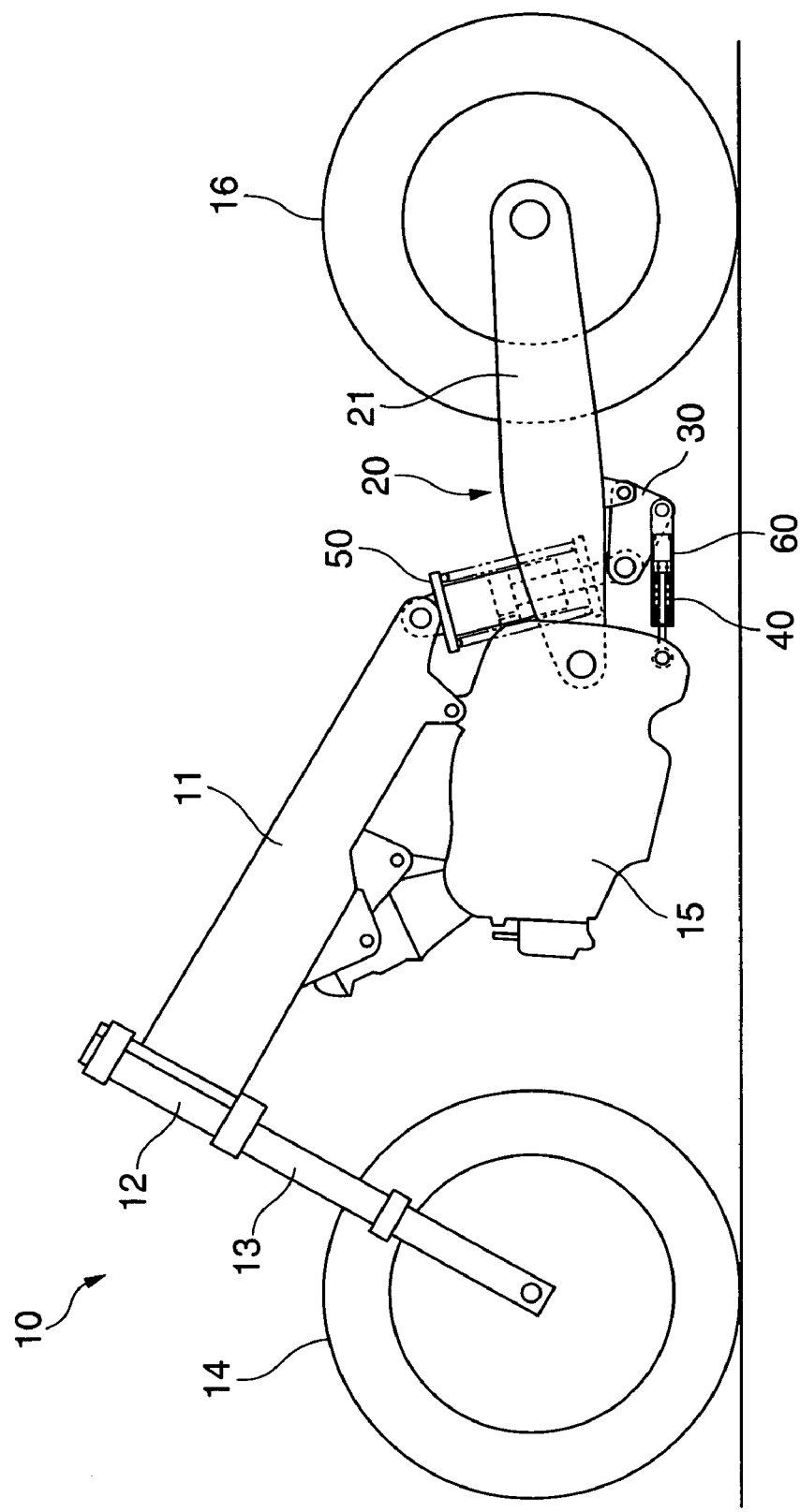
FIG. 1 is a schematic view showing a motor cycle to which the present invention is applied.

A motor cycle 10 is structured, as shown in FIG. 1, such that a front fork 13 and a front wheel 14 are mounted to a head pipe 12 provided in a front end portion of a frame 11 corresponding to a vehicle body side so as to be freely steered. A power unit 15 comprising an engine and a transmission and corresponding to the vehicle body side is mounted to a lower portion of the frame 11. A rear wheel 16 is mounted to a rear portion of the power unit 15 via a swing arm type suspension apparatus 20 in accordance with the present invention.

Figure 2:
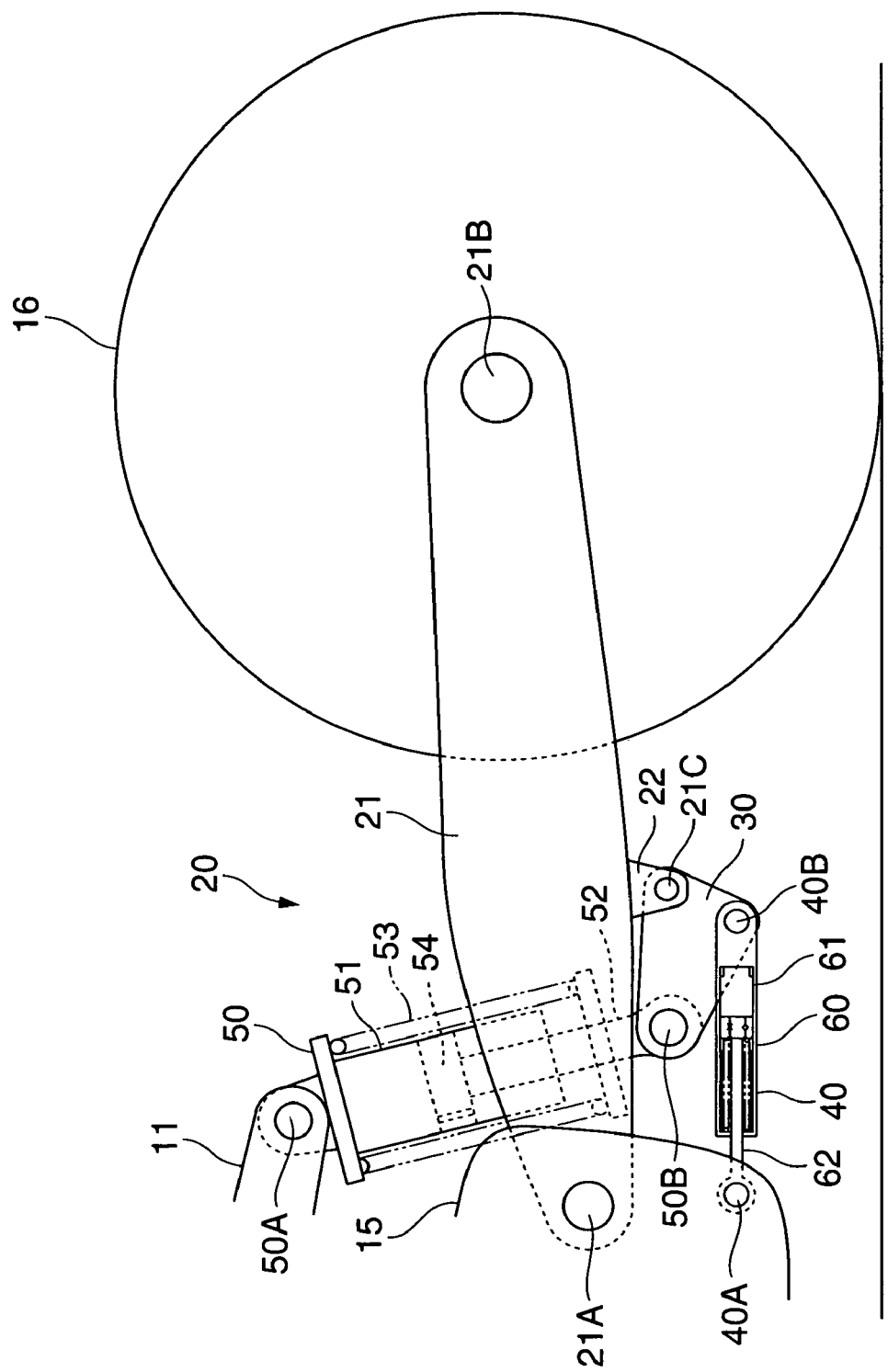
FIG. 2 is a schematic view showing an assembled state of a suspension apparatus in accordance with an embodiment 1.

The suspension apparatus 20 comprises, as shown in FIG. 2, a base end portion of a swing arm 21 pivotally attached to the rear portion of the power unit 15 via a pivot shaft 21A so as to be freely oscillated. The rear wheel 16 is supported to a leading end portion of the swing arm 21 via an axle 21B so as to be freely rotated.

The suspension apparatus 20 comprises a first link 30 pivotally attached to a lower bracket 22 provided in a lower portion of the swing arm 21 between the base end portion (the pivot shaft 21A) and the leading end portion (the axis 21B) of the swing arm 21, via a connection shaft 21C. The connection shaft 21C is arranged below a line obtained by connecting the pivot shaft 21A to the axle 21B.

The suspension apparatus 20 comprises a second link 40 pivotally attached to a position below a pivot point (the pivot shaft 21A) to which the base end portion of the swing arm 21 in the power unit 15 is pivotally attached, via a connection shaft 40A. The first link 30 and the second link 40 are pivotally attached via a connection shaft 40B.

The suspension apparatus 20 comprises an upper end of a cushion unit (a hydraulic shock absorber) 50 pivotally attached to the frame 11 via a connection shaft 50A, and a lower end of the cushion unit 50 pivotally attached to the first link 30 via a connection shaft 50B. The connection shaft 50A is arranged above the pivot shaft 21A of the power unit 15.

The cushion unit 50 has a cylinder 51. A piston rod 52 is inserted into the cylinder 51, and is structured such that the cylinder 51 is mounted to the connection shaft 50A, and the piston rod 52 is mounted to the connection shaft 50B. The cushion unit 50 is provided with a suspension spring 53 comprising a compression coil spring between the cylinder 51 and the piston rod 52, and buffers an impact force which is applied to the vehicle from it's interaction with a road surface, on the basis of an expansion and contraction of the suspension spring 53. The cushion unit 50 comprises a working fluid sealed within the cylinder 51. Expansion side and compression side damping force generating apparatuses are provided in a piston 54 or the like arranged in an insertion end of the piston rod 52 to the cylinder 51, and damps an expanding and contracting vibration of the suspension spring 53.

Accordingly, in the suspension apparatus 20, the second link 40 is structured as an expandable link 60. The expandable link 60 can be expanded and contracted, and is energized in a contracting direction.

Figure 6:
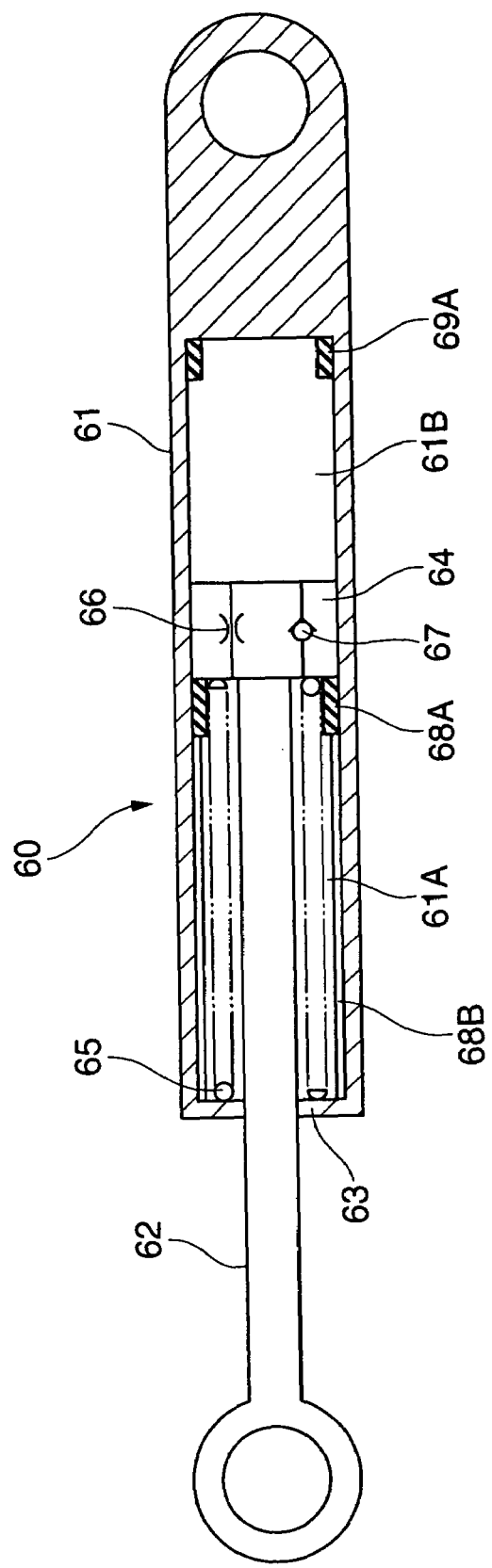
FIG. 6 is a schematic view showing an expandable link.

The expandable link 60 has a cylinder 61 and a piston rod 62 which is inserted into the cylinder 61 in a telescopic manner, as shown in FIG. 6, and comprises a hydraulic damper in which a working fluid is sealed within the cylinder 61. The expandable link 60 comprises a compression coil spring 65 energizing in a direction that the cylinder 61 and the piston rod 62 are contracted with each other and being internally provided between a rod guide 63 sealed in an opening end of the cylinder 61 and being provided for the piston rod 62. A piston 64 is provided in an insertion end of the piston rod 62 to the cylinder 61. The expandable link 60 is provided with an expansion side damping force generating means 66 provided in an oil passage communicating two oil chambers 61A and 61B sectioned in an inner portion of the cylinder 61 by the piston 64 and comprises an orifice in the piston 64, and a check valve 67 provided in an oil passage communicating two oil chambers 61A and 61B bypassing the expansion side damping force generating means 66 during compression. The expandable link 60 comprises a stopper rubber 68A regulating an expanded end position of the piston 64 arranged in the oil chamber 61A to which the piston rod 62 is inserted in the inner portion of the cylinder 61, in a state of being backed up by a collar 68B. A stopper rubber 69A regulating a compressed end position of the piston 64 is arranged in the opposite side oil chamber 61B. In other words, the expandable link 60 is energized by a spring force of the spring 65 in the contracting direction, and has a damping force or a rebound force in the expanding direction. The expandable link 60 has a minimum length in a free state on the basis of the spring force of the spring 65.

The suspension apparatus 20 comprises the piston rod 62 of the expandable link 60 (the second link 40) is connected to the power unit 15 via the connection shaft 40A. The cylinder 61 is connected to the first link 30 via the connection shaft 40B, and the expandable link 60 is set to a maximum expanded state (FIG. 6) in a state of being assembled in the vehicle, a state in which a load of a rider or the like is not applied.

A description will be given below of the operation and effect of the suspension apparatus 20 in accordance with an embodiment 1.

Figure 3A:
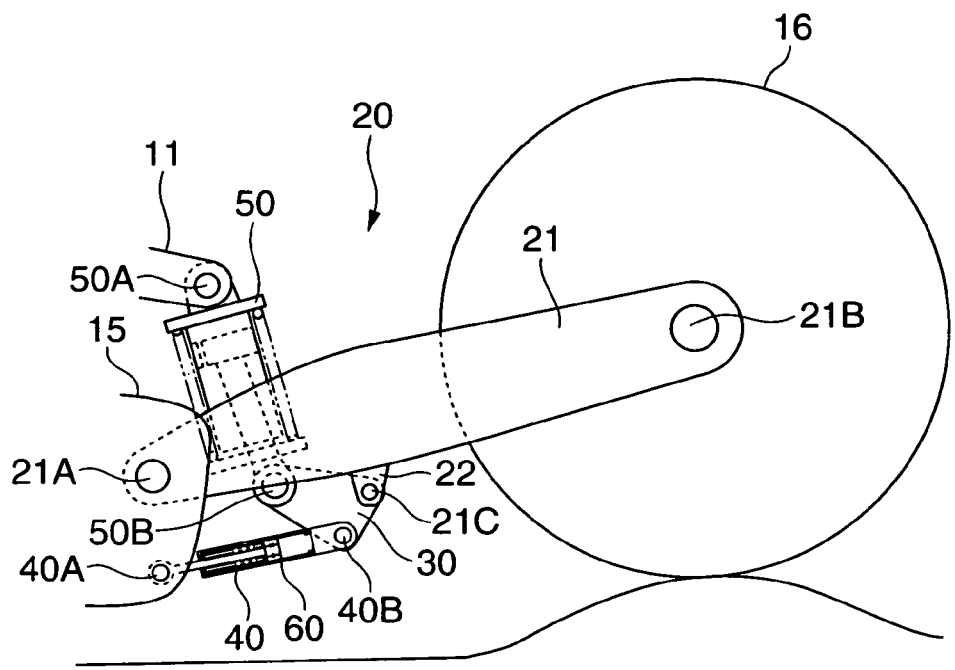
Figure 3B:
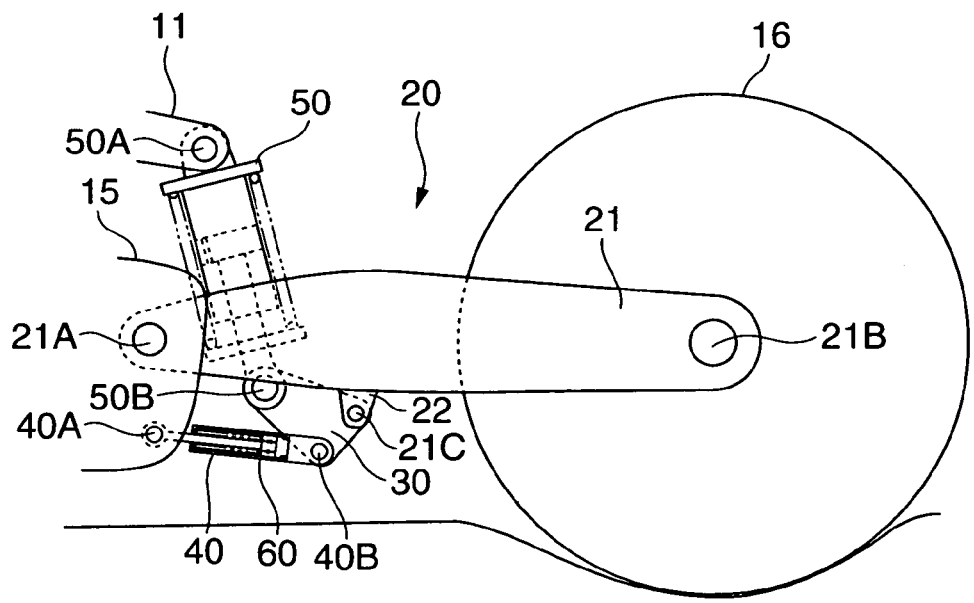
Figure 4:
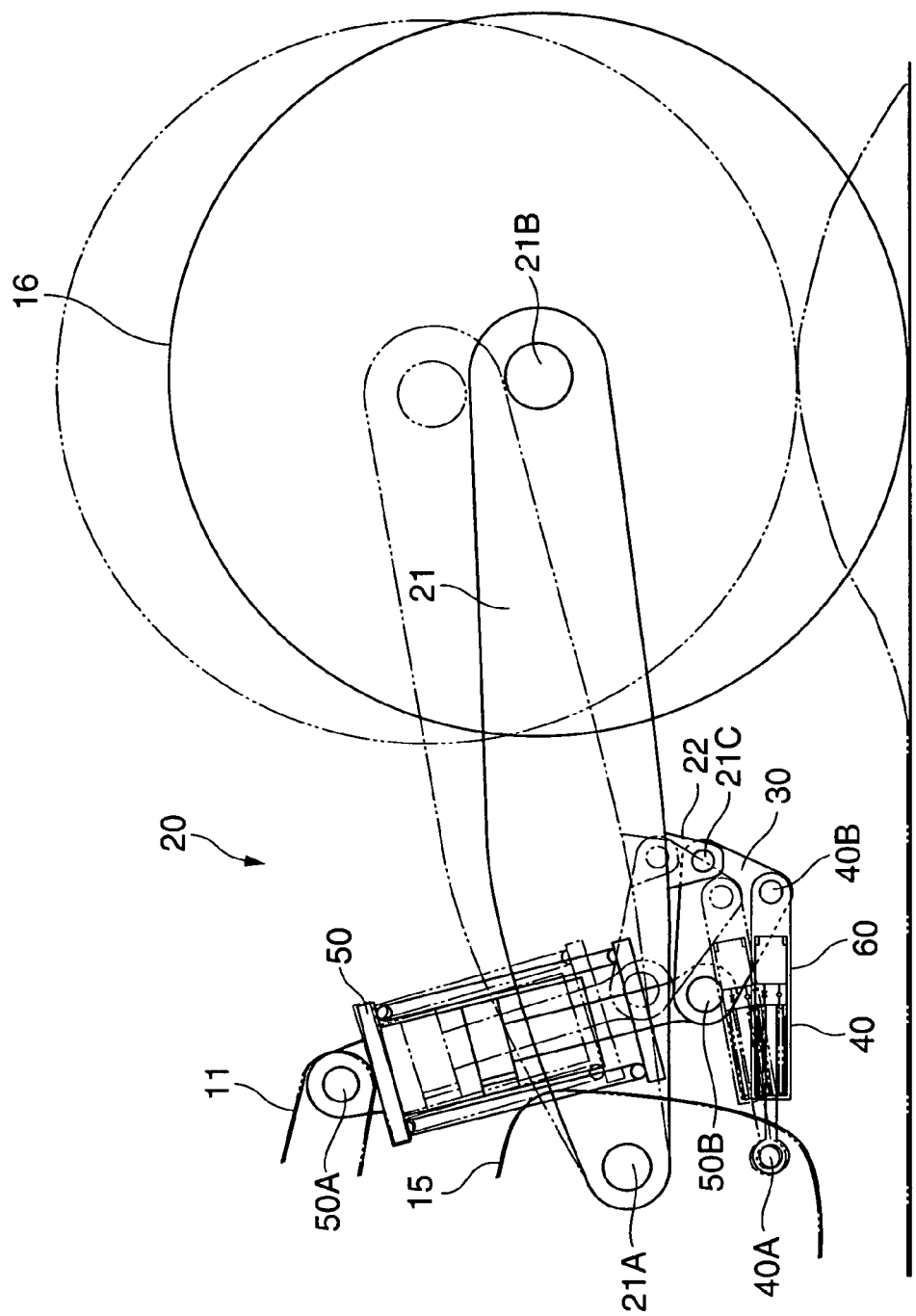
FIG. 4 is a schematic view showing the assembled state and the swing arm upward moving state of the embodiment 1 in an overlapping manner.

(a) In the case that the rider rides on the vehicle or the vehicle runs against a projection on the road surface, whereby the swing arm 21 is moved upward (FIG. 4) from an assembled state in FIG. 2 to an upward moved state in FIG. 3A, the expandable link 60 which is already in it's most expanded position is regulated in the expansion in the axial direction so as to be a rigid body in the axial direction, and carries out a compression motion of the cushion unit 50.

Figure 5:
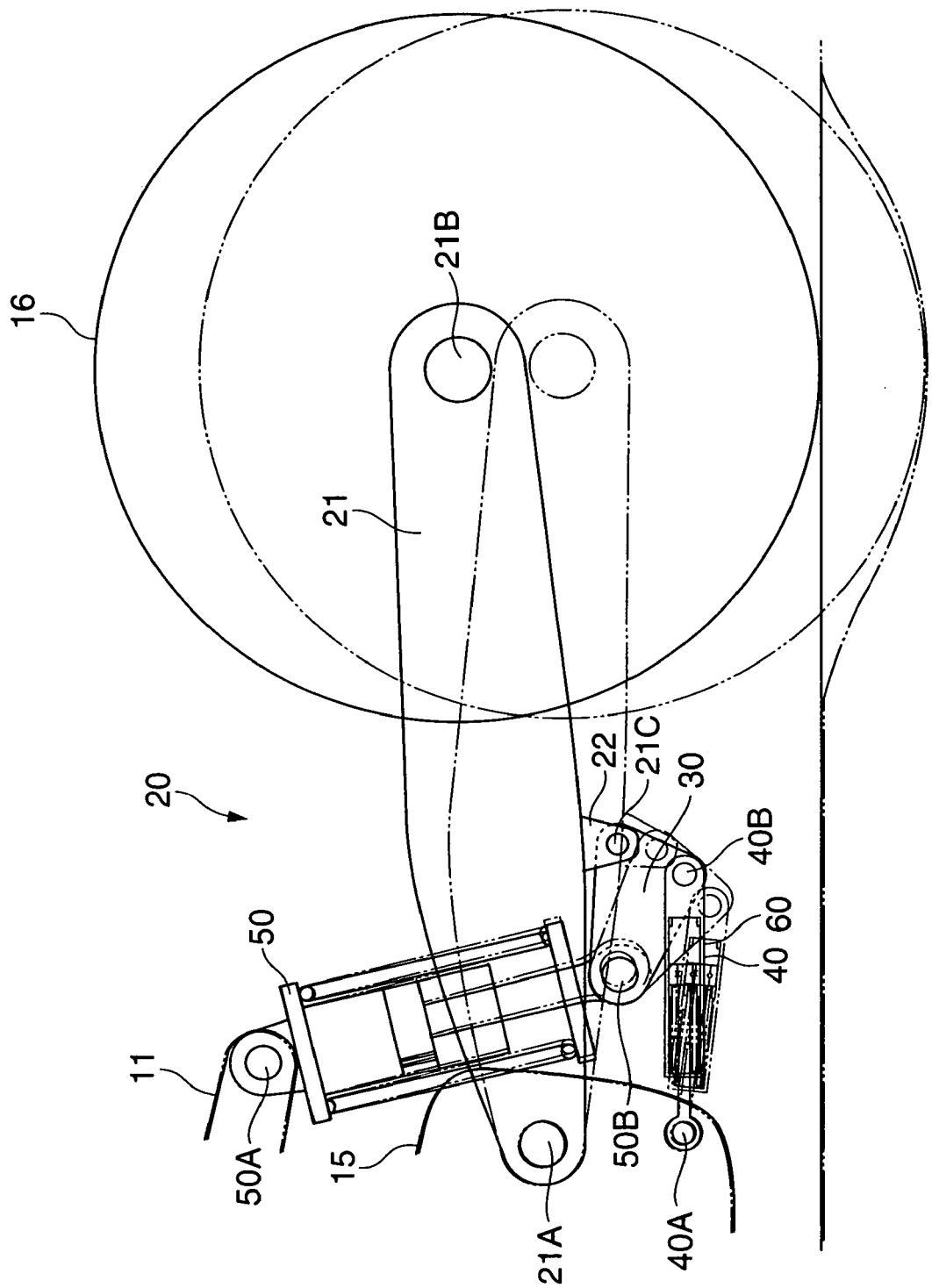
FIG. 5 is a schematic view showing the assembled state and the swing arm downward moving state of the embodiment 1 in an overlapping manner.

In the case that the load applied to the rear wheel 16 from the road surface is reduced while running along the road surface gap (the recess) or while braking the vehicle, the expansion of the cushion unit 50 delays due to the existence of the expansion side damping force generating means when the swing arm 21 is going to move downward. The swing arm 21 is thereby not moved downward. The expandable link 60 is contracted at a moment on the basis of the energizing force in the contracting direction so as to pull the swing arm 21 to a lower side. At this time, the pivot point (the connection shaft 50B) in the lower end portion of the cushion unit 50 does not move. The swing arm 21 moves downward to the downward position in FIG. 3B from the assembled state in FIG. 2 (FIG. 5). Accordingly, the rear wheel 16 is in contact with the road surface. It is possible to avoid a reduction of the driving force, and it is possible to maintain stability of the vehicle.

(b) The expandable link 60 is energized in the contracting direction, and is kept at a minimum length in the free state. However, it is kept at a maximum length on the basis of the spring force of the suspension spring 53 of the cushion unit 50 or the like in a state of being assembled in the vehicle. Accordingly, when the rider rides on the vehicle, the vehicle runs against the projection on the road surface and the swing arm 21 moves upward as described in the item (a) mentioned above. The expandable link 60 is securely regulated in expansion in the axial direction so as to be a rigid body in the axial direction. Thereby compressing the cushion unit 50.

(c) The expandable link 60 generates the expansion side damping force during a period that the swing arm 21 moves downward in accordance with the item (a) mentioned above. The rear wheel 16 gets free of the recess on the road surface after being in contact with the recess on the road surface, and the swing arm 21 again moves upward. In other words, during a period that the expansible link 60 is extended from the contracted state to the assembled state to the vehicle, the maximum length state. Accordingly, the expandable link 60 absorbs an upthrow input from the road surface, and improves ride quality. Further, it is possible to prevent the impact generated when the expandable link 60 is fully expanded, the piston rod 62 being prevented from coming into collision with the rod guide 63 of the cylinder 61.

(d) Since the expansible link 60 is provided with the means (the check valve 67) for bypassing the extension side damping force generating means 66 during compression, the expandable link 60 is rapidly set to the contracted state when the swing arm 21 moves downward in accordance with the item (a) mentioned above. It is thereby possible to secure the road holding or the road surface following property of the rear wheel 16.

(e) Since the expandable link 60 is internally provided with the spring 65 energizing in the contracting direction of the cylinder 61, it is possible to improve operability of the expandable link 60.

(f) The expandable link 60 can easily assemble the expansion side damping force generating means 66 and the bypassing means thereof, by structuring the hydraulic damper.

Figure 7A:
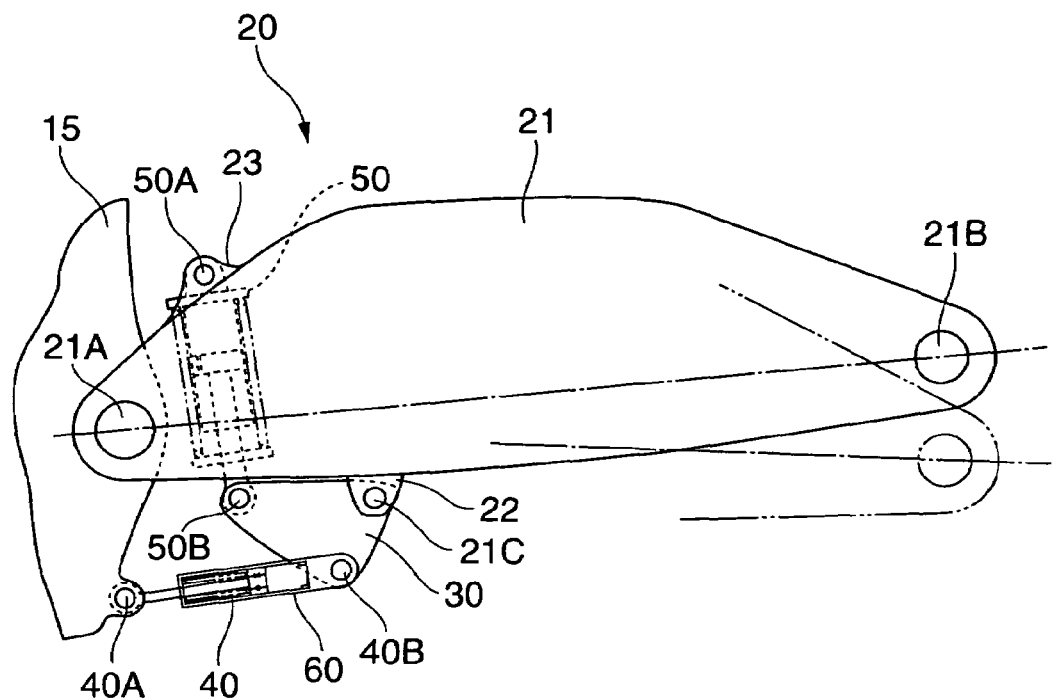
Figure 7B:
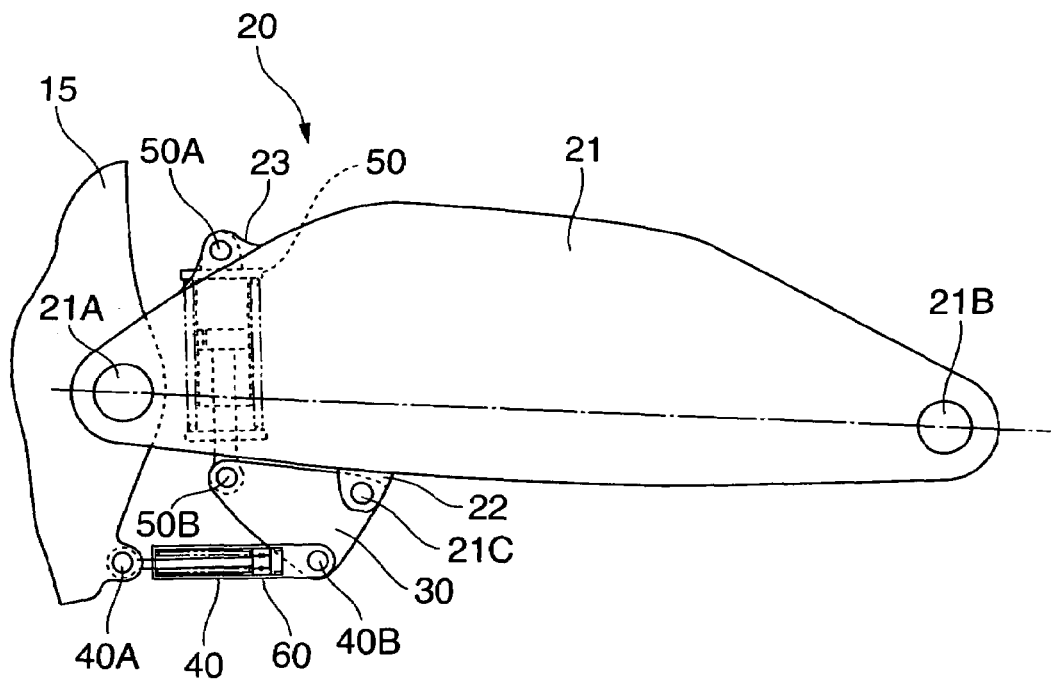

Embodiment 2—FIGS. 7A and 7B

A suspension apparatus 20 in accordance with an embodiment 2 shown in FIGS. 7A and 7B is different from the suspension apparatus 20 in accordance with the embodiment 1 in that the upper end of the cushion unit 50 is pivotally attached to an upper bracket 23 provided in an upper portion of the swing arm 21 in place of the frame 1, via the connection shaft 50A. The connection shaft 50A is arranged above a line connecting the pivot shaft 21A to the axle 21B.

In accordance with the suspension apparatus 20 of the embodiment 2, the following operations and effects are achieved.

In the case that the rider rides on the vehicle or the vehicle runs against a projection on the road surface, whereby the swing arm 21 is moved upward from an assembled state in FIG. 7A to an upward moved state, not shown, the expandable link 60 which is already completely expanded is regulated in the expansion of the axial direction so as to be a rigid body in the axial direction, and carries out a compression motion of the cushion unit 50.

In the case that the load applied to the rear wheel 16 from the road surface is reduced while running on the road surface gap (the recess) or during braking of the vehicle, the expansion of the cushion unit 50 delays due to the existence of the expansion side damping force generating means when the swing arm 21 is going to move downward, whereby the swing arm 21 is not moved downward. The expandable link 60 is contracted on the basis of the energizing force in the contracting direction so as to pull the swing arm 21 to a lower side, at this time, the pivot point in the lower end portion of the cushion unit 50 (the connection shaft 50B) does not move. The swing arm 21 moves downward to the downward position in FIG. 7B from the assembled state in FIG. 7A. Accordingly, the rear wheel 16 is in contact with the road surface. It is possible to avoid a reduction of the driving force. It is also possible to maintain stability of the vehicle.

Further, in accordance with the suspension apparatus 20 of the embodiment 2, the same operations and effects as the operations and effects (b) to (f) of the embodiment 1 are achieved.

Figure 8A:
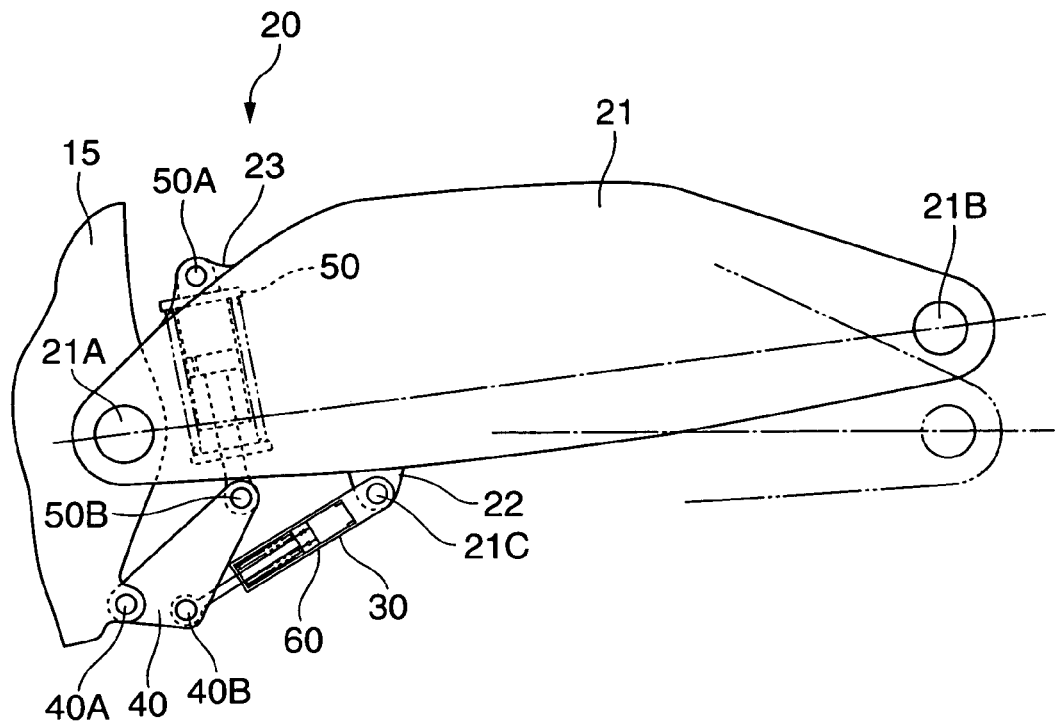
Figure 8B:
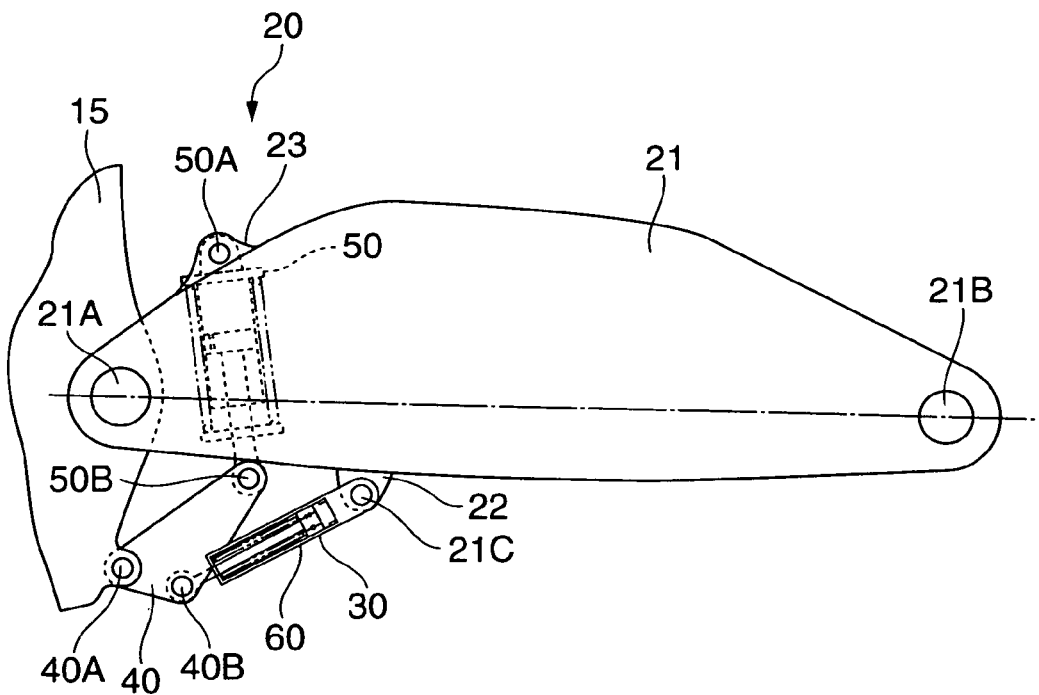

Embodiment 3—FIGS. 8A and 8B

A suspension apparatus 20 in accordance with an embodiment 3 shown in FIGS. 8A and 8B is different from the suspension apparatus 20 in accordance with the embodiment 2 in that the lower end of the cushion unit 50 is pivotally attached to the second link 40 in place of the first link 30, via the connection shaft 50B, and that the first link 30 comprises an expandable link 60.

In accordance with the suspension apparatus 20 of the embodiment 3, the following operations and effects are achieved.

In the case that the rider rides on the vehicle or the vehicle runs against a projection on the road surface, whereby the swing arm 21 is moved upward from an assembled state in FIG. 8A to an upward position, not shown, the expandable link 60 which is already in the maximum expansion position is regulated in it's expansion in the axial direction so as to be a rigid body in the axial direction, and thereby carries out a compression motion of the cushion unit 50.

In the case that the load applied to the rear wheel 16 from the road surface is reduced while running along a road surface gap (the recess) or when braking the vehicle, the expansion of the cushion unit 50 delays due to the existence of the expansion side damping force generating means when the swing arm 21 is going to move downward, whereby the swing arm 21 is not moved downward. The expandable link 60 is contracted on the basis of the energizing force in the contracting direction so as to pull the swing arm 21 to a lower side, at this time, the pivot point in the lower end portion of the cushion unit 50 (the connection shaft 50B) does not move, and the swing arm 21 moves downward to the downward position in FIG. 8B from the assembled state in FIG. 8A. Accordingly, the rear wheel 16 is in contact with the road surface. It is thereby possible to avoid reduction of the driving force, and it is possible to maintain stability of the vehicle.

Further, in accordance with the suspension apparatus 20 of the embodiment 3, the same operations and effects as the operations and effects (b) to (f) of the embodiment 1 are achieved.

Embodiment 4—FIGS. 9A and 9B

A suspension apparatus 20 in accordance with an embodiment 4 shown in FIGS. 9A and 9B is different from the suspension apparatus 20 in accordance with the embodiment 1 in that the lower end of the cushion unit 50 is pivotally attached to the second link 40 in place of the first link 30, via the connection shaft 50B, and that the first link 30 comprises an expandable link 60.

The second link 40 comprises a bell crank. The connection shaft 40B between the first link 30 (the expansible link 60) and the second link 40 is arranged at the midpoint of the connection shaft 40A between the second link 40 and the power unit 15, and the connection shaft 50B between the second link 40 and the cushion unit 50.

In accordance with the suspension apparatus 20 of the embodiment 4, the following operations and effects are achieved.

In the case that the rider rides on the vehicle or the vehicle runs against a projection on the road surface, whereby the swing arm 21 is moved upward from an assembled state in FIG. 9A to an upward position, not shown, the expandable link 60 which is already completely expanded is regulated in its expansion in the axial direction so as to be a rigid body in the axial direction, and carries out a compression motion of the cushion unit 50.

In the case that the load applied to the rear wheel 16 from the road surface is reduced while running along road surface gap (the recess) or when braking the vehicle, the expansion of the cushion unit 50 delays due to the existence of the expansion side damping force generating means when the swing arm 21 is going to move downward. Whereby the swing arm 21 is not moved downward. The expandable link 60 is contracted at a moment on the basis of the energizing force in the contracting direction so as to pull the swing arm 21 to a lower side. At this time, the pivot point in the lower end portion of the cushion unit 50 (the connection shaft 50B) does not move, and the swing arm 21 moves downward to the downward position in FIG. 9B from the assembled state in FIG. 9A. Accordingly, the rear wheel 16 is in contact with the road surface. It is possible to avoid a reduction of the driving force, and it is possible to maintain stability of the vehicle.

Further, in accordance with the suspension apparatus 20 of the embodiment 4, the same operations and effects as the operations and effects (b) to (f) of the embodiment 1 are achieved.

Figure 10:
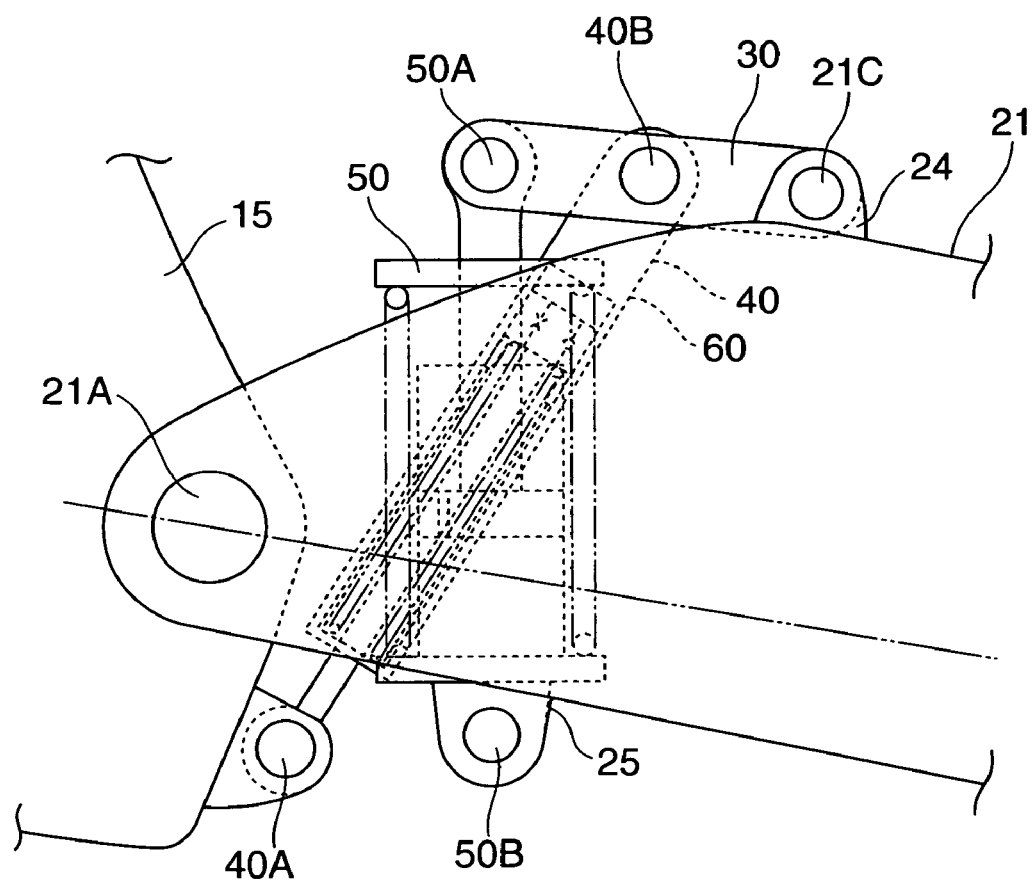
FIG. 10 is a schematic view showing a suspension apparatus in accordance with an embodiment 5.

Embodiment 5—FIG. 10

A suspension apparatus 20 in accordance with an embodiment 5 shown in FIG. 10 is different from the suspension apparatus 20 in accordance with the embodiment 1 in that the first link 30 is pivotally attached to the upper bracket 24 of the swing arm 21 between the base end portion (the pivot shaft 21A) and the leading end portion (the axle 21B) of the swing arm 21, via the connection shaft 21C. The connection shaft 21C is arranged above the line connecting the pivot shaft 21A to the axle 21B. The upper end of the cushion unit 50 is pivotally attached to the first link 30 via the connection shaft 50A where the connection shaft 50A is arranged above the line connecting the pivot shaft 21A to the axle 21B. The lower end of the cushion unit 50 is pivotally attached to the lower bracket 25 of the swing arm 21 between the base end portion (the pivot shaft 21A) and the leading end portion (the axle 21B) of the swing arm 21, via the connection shaft 50B. The connection shaft 50B is arranged below the line connecting the pivot shaft 21A to the axle 21B. The second link 40 is connected to a portion between the connection shaft 21C to the swing arm 21 in the first link 30 via the connection shaft 40B, and the connection shaft 50A to the cushion unit 50.

In accordance with the suspension apparatus 20 of the embodiment 5, the following operations and effects are achieved.

In the case that the rider rides on the vehicle or the vehicle runs against a projection on the road surface, whereby the swing arm 21 is moved upward from an assembled state, the expandable link 60 which is already completely expanded is regulated in the expansion in the axial direction so as to be a rigid body in the axial direction, and carries out a compression motion of the cushion unit 50.

In the case that the load applied to the rear wheel 16 from the road surface is reduced while running along the road surface gap (the recess) or when braking the vehicle, the expansion of the cushion unit 50 delays due to the existence of the expansion side damping force generating means when the swing arm 21 is going to move downward, whereby the swing arm 21 is not moved downward. The expandable link 60 is contracted at a moment on the basis of the energizing force in the contracting direction so as to pull the swing arm 21 to a lower side. At this time, the pivot point in the lower end portion of the cushion unit 50 (the connection shaft 50B) does not move, and the swing arm 21 moves downward from the assembled state. Accordingly, the rear wheel 16 is in contact with the road surface. It is possible to avoid a reduction of the driving force, and it is possible to maintain stability of the vehicle.

Further, in accordance with the suspension apparatus 20 of the embodiment 5, the same operations and effects as the operations and effects (b) to (f) of the embodiment 1 are achieved.

In this case, in the present invention, the expandable link 60 may be provided between the connection shaft 21C to the swing arm 21 in the first link 30 to which the cushion unit 50 is pivotally attached, and the connection shaft 40 to the second link 40, or between the connection shaft 40A to the vehicle body side in the second link 40 to which the cushion unit 50 is pivotally attached, and the connection shaft 40B to the first link 30. In this case, it is preferable that the first link 30 or the second link 40 to which the cushion unit 50 is not pivotally attached is comprises the expansible link 60.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A suspension apparatus of a vehicle comprising:
   a base end portion of a swing arm pivotally attached to a vehicle body so as to freely oscillate, a wheel rotatably supported to a leading end portion of the swing arm;
   a first link pivotally attached to a portion between the base end portion and the leading end portion of the swing arm, a second link pivotally attached to a position which is below a pivot point to which the base end portion of the swing arm is pivotally attached in the vehicle body, the first link and the second link being pivotally attached;
   one end of a cushion unit is pivotally attached to the vehicle body, and another end of the cushion unit is pivotally attached to one of the first link and the second link, wherein the first link or the second link comprises an expandable link, and the expandable link is positionable in an expandable position and is energized in a contracting direction, the expandable link having a check valve for bypassing extension direction fluid damping force generating means during compression of the link, the expandable link being installed such that it exerts an active contracting force tending to urge the swing arm down when the swing arm is movable towards the ground due to reduction of an upward acting road surface force.

2. A suspension apparatus of a vehicle as claimed in claim 1, wherein the expansible link achieves a most expanded state in a state of being assembled in the vehicle.

3. A suspension apparatus of a vehicle as claimed in claim 1, wherein the expansible link is provided with an expansion side damping force generating means, and a means for bypassing the expansion side damping force generating means during compression.

4. A suspension apparatus of a vehicle as claimed in claim 3, wherein the expansible link constitutes a hydraulic damper.

5. A suspension apparatus of a vehicle as claimed in claim 3, wherein the expansible link is structured such that the piston rod is inserted to the cylinder, and the piston is provided in the insertion end of the piston rod to the cylinder, and wherein the expansion side damping force generating means is provided in the piston, and is constituted by an orifice which is provided in an oil passage communicating two oil chambers sectioned in an inner portion of the cylinder by the piston.

6. A suspension apparatus of a vehicle as claimed in claim 5, wherein the expansible link is structured such that a first stopper rubber regulating an expanded end position of the piston is arranged in one side oil chamber to which the piston rod is inserted in the inner portion of the cylinder, and a second stopper rubber regulating a compressed end position of the piston is arranged in another side oil chamber.

7. A suspension apparatus of a vehicle as claimed in claim 1, wherein the expansible link Is structured such that a piston rod is inserted to a cylinder, and a spring energizing the cylinder and the piston rod in a contracting direction with each other is internally provided in the cylinder.

8. A suspension apparatus of a vehicle as claimed in claim 7, wherein the spring is constituted by a coil spring which is provided between a rod guide for the piston rod sealed in an opening end of the cylinder, and a piston provided in an insertion end of the piston rod to the cylinder.

9. A suspension apparatus of a vehicle as claimed in claim 3, wherein the expansible link Is structured such that the piston rod is inserted to the cylinder, and the piston is provided In the Insertion end of the piston rod to the cylinder, and wherein the means for bypassing the expansion side damping force generating means at the compressing time is provided in the piston, and is constituted by a check valve which is provided in an oil passage communicating two oil chambers sectioned in an inner portion of the cylinder by the piston.

10. A suspension apparatus of a vehicle as claimed in claim 9, wherein the expansible link is structured such that a first stopper rubber regulating an expanded end position of the piston is arranged in one side oil chamber to which the piston rod is inserted in the inner portion of the cylinder, and a second stopper rubber regulating a compressed end position of the piston is arranged in another side oil chamber.

11. A suspension apparatus of a vehicle comprising:

a base end portion of a swing arm pivotally attached to a vehicle body so as to freely oscillate, a wheel rotatably supported to a leading end portion of the swing arm;

a first link pivotally attached to a portion between the base end portion and the leading end portion of the swing arm, a second link pivotally attached to a position which is below a pivot point to which the base end portion of the swing arm is pivotally attached in the vehicle body, the first link and the second link being pivotally attached;

one end of a cushion unit is pivotally attached to the swing arm, and another end of the cushion unit is pivotally attached to one of the first link and the second link, wherein the first link or the second link comprises an expandable link, and the expandable link is positionable in an expandable position and is energized in a contracting direction, the expandable link having a check valve for bypassing extension direction fluid damping force generating means during compression of the link, the expandable link being installed such that it exerts an active contracting force tending to urge the swing arm down when the swing arm is movable toward the around due to reduction of an upward acting road surface force.

12. A suspension apparatus of a vehicle as claimed in claim 11, wherein the expansible link achieves a most expanded state in a state of being assembled in the vehicle.

13. A suspension apparatus of a vehicle as claimed in claim 11, wherein the expansible link is provided with an expansion side damping force generating means, and a means for bypassing the expansion side damping force generating means during compression.

14. A suspension apparatus of a vehicle as claimed in claim 13, wherein the expansible link constitutes a hydraulic damper.

15. A suspension apparatus of a vehicle as claimed in claim 13, wherein the expansible link is structured such that the piston rod is inserted to the cylinder, and the piston is provided in the insertion end of the piston rod to the cylinder, and wherein the expansion side damping force generating means is provided in the piston, and is constituted by an orifice which is provided in an oil passage communicating two oil chambers sectioned in an inner portion of the cylinder by the piston.

16. A suspension apparatus of a vehicle as claimed in claim 11, wherein the expansible link is structured such that a piston rod is inserted to a cylinder, and a spring energizing the cylinder and the piston rod in a contracting direction with each other is internally provided in the cylinder.

17. A suspension apparatus of a vehicle as claimed in claim 16, wherein the spring is constituted by a coil spring which is provided between a rod guide for the piston rod sealed in an opening end of the cylinder, and a piston provided in an insertion end of the piston rod to the cylinder.

18. A suspension apparatus of a vehicle as claimed in claim 13, wherein the expansible link is structured such that the piston rod Is inserted to the cylinder, and the piston is provided in the insertion end of the piston rod to the cylinder, and wherein the means for bypassing the expansion side damping force generating means at the compressing time is provided in the piston, and is constituted by a check valve which is provided in an oil passage communicating two oil chambers sectioned in an inner portion of the cylinder by the piston.

* * * * *